United States Patent [19]

Herron

[11] Patent Number: 4,870,645

[45] Date of Patent: Sep. 26, 1989

[54] SINGLE SYNDROME GENERATOR FOR FORWARD AND REVERSE READ OF HIGH DENSITY MAGNETIC TAPE AND METHOD THEREFOR

[75] Inventor: John S. Herron, Broomfield, Colo.

[73] Assignee: Aspen Peripherals Corp., Longmont, Colo.

[21] Appl. No.: 183,729

[22] Filed: Apr. 20, 1988

[51] Int. Cl.$^4$ ............................................. G06F 11/10
[52] U.S. Cl. ................................... 371/37.4; 360/53
[58] Field of Search ....................... 371/38, 39, 40, 50, 371/51; 360/53

[56] References Cited

U.S. PATENT DOCUMENTS

| | | | |
|---|---|---|---|
| 3,868,632 | 2/1975 | Hong | 371/38 |
| 4,201,976 | 5/1980 | Patel | 371/50 |
| 4,205,324 | 5/1980 | Patel | 371/50 |
| 4,551,840 | 11/1985 | Fujii | 371/38 |

OTHER PUBLICATIONS

American National Standard Magnetic Tape and Cartridge for Information Interchange 18-Track, Parallel, 12.65 mm (½ in), 1491 cpmm (37 871 cpi)—Feb. 9, 1988.
Adaptive Cross-Parity (AXP) Code for a High-Density Magnetic Tape Subsystem by Arvind M. Patel.

*Primary Examiner*—Jerry Smith
*Assistant Examiner*—Robert W. Beausoliel
*Attorney, Agent, or Firm*—Dorr, Carson, Sloan & Peterson

[57] ABSTRACT

A single diagonal syndrome generator receives first (forward reading) and second (reverse reading) sets of eight-bit data and a single vertical syndrome generator receives the first and second sets of eight-bit data from a progammable read only memory. The second set of data is reversed in bit order prior to delivery to the syndrome generators. The output of the two syndrome generators are delivered into an error processor and an error correction circuit for correcting errors in the first and second sets of eight-bit data. Upon error correction, the second set of eight-bit data is again reversed to put it in the same bit order as originally read.

7 Claims, 4 Drawing Sheets

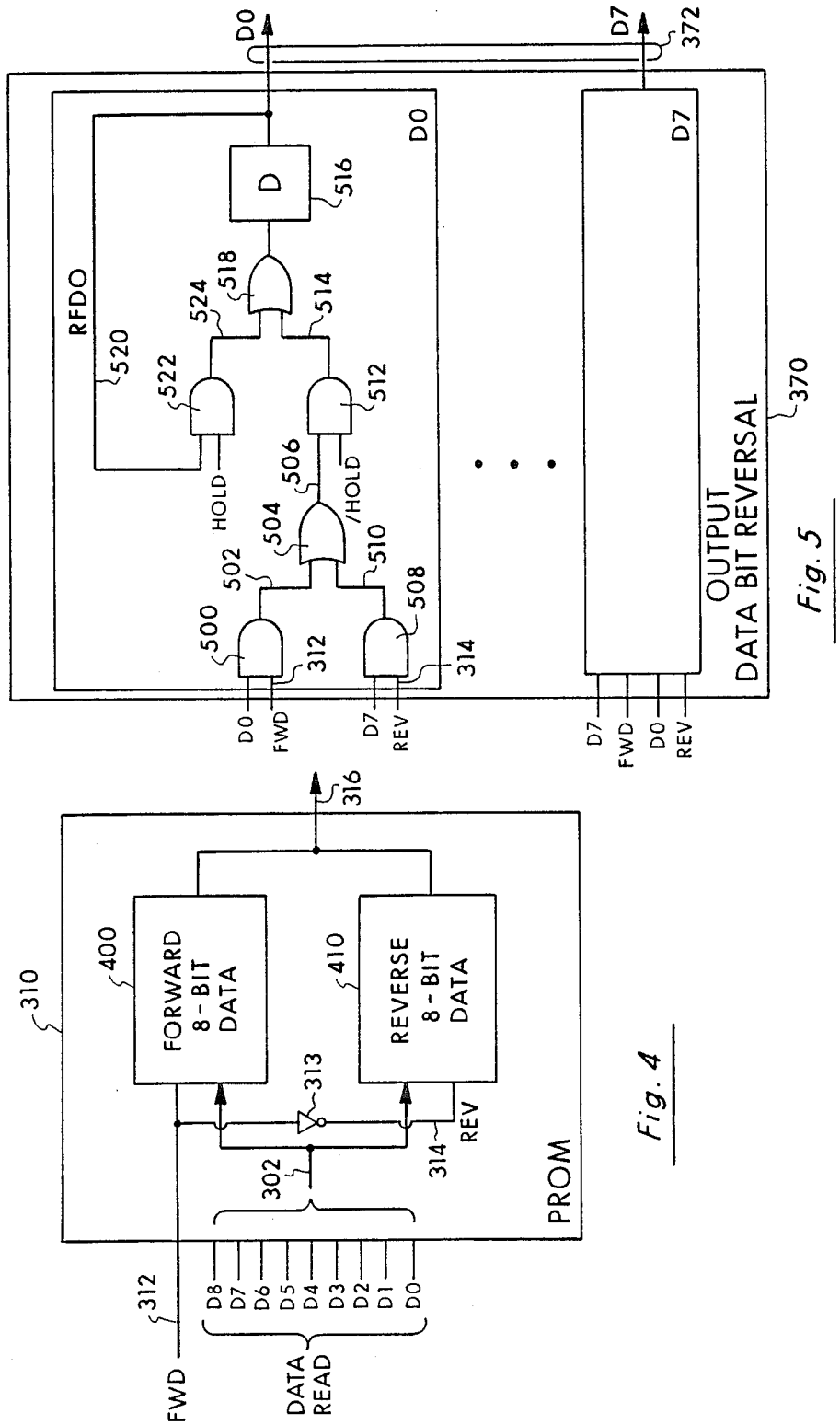

SINGLE SYNDROME GENERATOR FOR FORWARD AND REVERSE READ OF HIGH DENSITY MAGNETIC TAPE AND METHOD THEREFOR

BACKGROUND OF THE INVENTION

1. Field of the Invention

The present invention relates to a single syndrome generator for both forward and reverse read of high density magnetic tape in an error correction system utilizing adaptive cross-parity (AXP) and, in particular, the present invention relates to the use of a single syndrome generator during the forward and reverse read of IBM 3480 high density 18-track, parallel, magnetic tape in the adaptive cross-parity (AXP) code error correction system.

2. Discussion of Prior Art

The IBM 3480 magnetic tape sub-system is a high density eighteen-parallel track tape sub-system which forms the basis of the proposed American National Standard Magnetic Tape and Cartridge for Information Interchange, Eighteen Track, Parallel, 12.65 MM (½ inch), 1491 CPMM (37 871 CPI) Group-Coded Recording prepared by the Technical Committee X3B5 of Accredited Standards Committee X3 and identified in the document Text X3B5/88-044 published by the American National Standards Institute.

The magnetic tape is read in both the forward and reverse directions. An example of the magnetic tape is shown in FIG. 1. In FIG. 1, two groups of tracks Set A and Set B are shown with each set having nine tracks. Tracks A8 and B8 are VRC (vertical redundancy code) tracks and tracks A0 and B0 are DRC (diagonal redundancy code) tracks. The tape shown in FIG. 1, in the forward direction, moves in the direction of arrow 100 and, in the reverse direction, moves in direction of arrow 110. Hence, in the forward direction 100, the first frame read is FC1 and the reading continues through frame FC6, in the example shown in FIG. 1. Each frame is eight bits (one byte) wide.

An adaptive cross-parity code for the high density tape of FIG. 1 has been incorporated into the American National Standard and is discussed in an article by Patel, "Adaptive Cross Parity (AXP) Code For A High-Density Magnetic Tape Sub-System", IBM Journal of Research and Development, Volume 29, No. 6, Pg. 546-562 (Nov. 1985) and is also discussed in U.S. Pat. No. 4,201,976. This adaptive cross parity code utilizes a diagonal code procedure represented by lines 120 and 130 in FIG. 1. The "A Diagonal" 120 check spans sixteen bits and starts from the B0 (DRC) position in Set B and terminates at the A0 (DRC) position. It does not extend into the VRC tracks of A8 and B8. The "B Diagonal" 130 (DRC) position in Set A and terminates at the B0 (DRC) position.

The adaptive cross-parity code also utilizes a vertical parity check as represented by line 140 and the code set forth in the VRC tracks A8 and B8. If a given track is in error such as track B4 as shown by line 150, then a particular bit which is in error 160 can be corrected according to the adaptive cross-parity code through use of the cross diagonals 120 and 130 and the vertical line 140 for Set B (which encompasses B0 through B8).

In FIG. 2, is shown a conventional approach for processing and correcting errors such as error 160 according to adaptive cross-parity code. As shown in FIG. 2, the reel to reel high density magnetic tape is conventionally read 200 from a reel to reel tape 190 and the nine bit data read is delivered over bus 202 to a nine to eight decode 204 which typically is a programmable read only memory (PROM). The nine to eight decode circuit 204 conventionally converts the nine bit data on the tape to the eight bit data required by the user system according to the ANSI standard as set forth above. The eight bit data is delivered over bus 206 to an error correction system 210 and to a delay FIFO 212. Delay FIFO 212 delays the data on bus 206 sufficiently long to allow the error correction system 210 to correct, if necessary, an error in a given data reading. The error correction system 210 is comprised of a forward syndrome generator 220, a reverse syndrome generator 230, a multiplexer 240, an error processor 250, and an error correction circuit 260. If the tape is being read in the forward direction, the forward syndrome generator 220 is activated by lead 222 and the forward syndrome generator 220 activates the vertical syndrome generator 224 and the diagonal syndrome generator 226 to deliver calculated check sums to the multiplexer 240 which delivers the forward diagonal syndrome generated information (A and B) for the "A Diagonal" and for the "B Diagonal" and the V information from the vertical syndrome generator to the error processor 250. Likewise, when the tape is read in the reverse direction, a signal is delivered over line 232 to the reverse syndrome generator 230 which contains a vertical syndrome generator 234 and a diagonal syndrome generator 236 for delivery of the calculated check sums to the multiplexer 240. In this fashion, the error processor receiving the diagonal code (A and B) information as well as the vertical code (V) information from either the forward syndrome generator 220 or the reverse syndrome generator 230 and receiving conventionally generated pointers P over line 252 is capable of generating the necessary information on line 254 for delivery to the error correction circuit 260 to correct the errors (for example error 160 in FIG. 1) in a conventional fashion. The corrected data is then delivered over lines 214 to a buffer circuit 270 for delivery over bus 272 into the user system. The use of pointers are fully discussed in U.S. Pat. No. 4,201,976.

The reason the prior art approach of FIG. 2 requires two separate syndrome generators 220 and 230 resides in the fact that as the tape is read and decoded, in reverse, the data bit fields placed on bus 206 are received in reverse order. In other words, the reverse syndrome generator 230 must operate in the opposite direction of the forward syndrome generator 220.

The present invention improves upon the prior art approach of FIG. 2 by utilizing only a single syndrome generator in the error correction system. This is accomplished by reversing the data bit order within each data byte before and after the error correction process, if the direction of the tape is reverse.

SUMMARY OF THE INVENTION

The present invention solves the problem of providing separate syndrome circuits, one for forward reading and one for reverse reading, by utilizing only one set of syndrome circuits for reading in both directions.

The system of the present invention is an error correction data reading system having a programmable read only memory for decoding the nine bit data on the high density magnetic tape into two sets of eight-bit data. The first set of eight-bit data corresponds to the nine-bit data when the reel to reel tape moves in a forward direction. The second set of eight-bit data corresponds to the nine-bit data when the reel to reel tape moves in the reverse direction. However, the second set of eight-bit data is in reverse bit order relative to the eight-bit data used when the tape direction is forward.

A single diagonal syndrome generator receives the first and second sets of eight-bit data and a single vertical syndrome generator also receives the first and second sets of eight-bit data from the programmable read only memory. The output of the two syndrome generators are delivered into an error processor and an error correction circuit for correcting any error in the first or second sets of eight-bit data. Upon error correction, the second set of eight-bit is again reversed to put it in the same bit order as originally read.

DESCRIPTION OF THE DRAWING

FIG. 4 is the schematic details of the PROM of the present invention performing input data reversal; and FIG. 5 is the logical representation showing the output data reversal of the present invention.

SPECIFICATION

Figure 1:
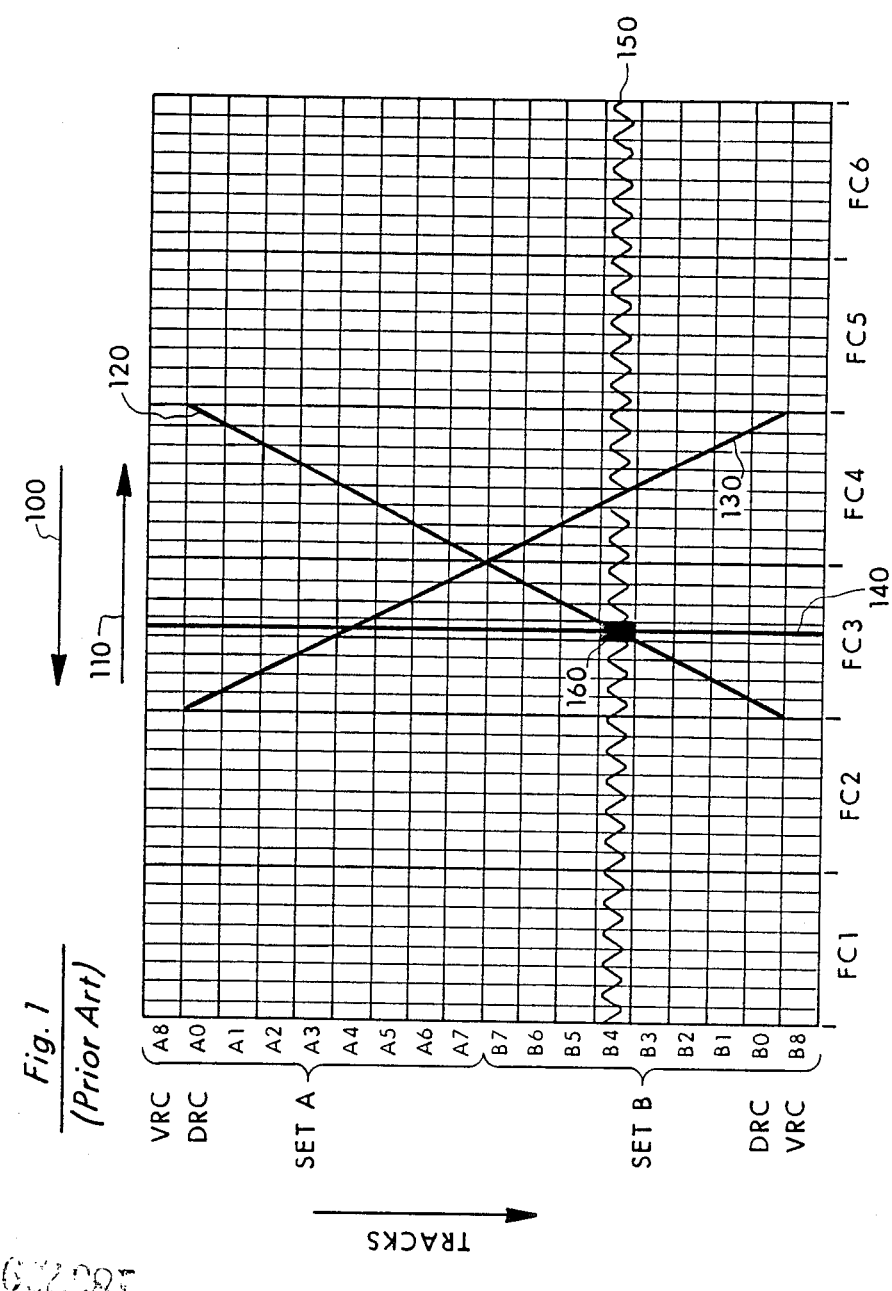
FIG. 1 is a prior art representation of an eighteen track, parallel, high density magnetic tape having vertical redundancy codes (VRC) and diagonal redundancy codes (DRC)
Figure 2:
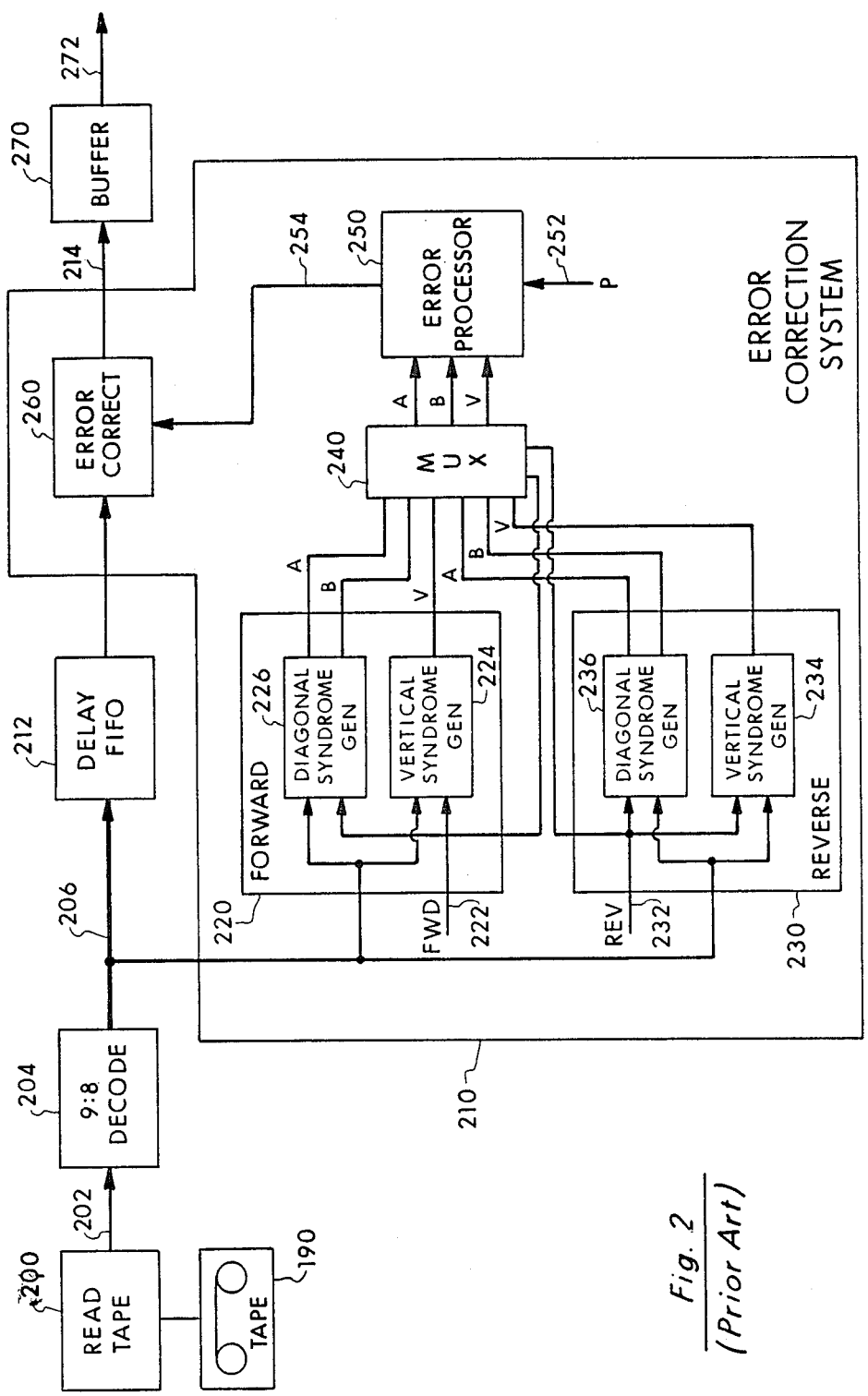
FIG. 2 sets forth the prior art approach generating forward and reverse syndromes into an error processor for error correction according to the adaptive cross-parity code.
Figure 3:
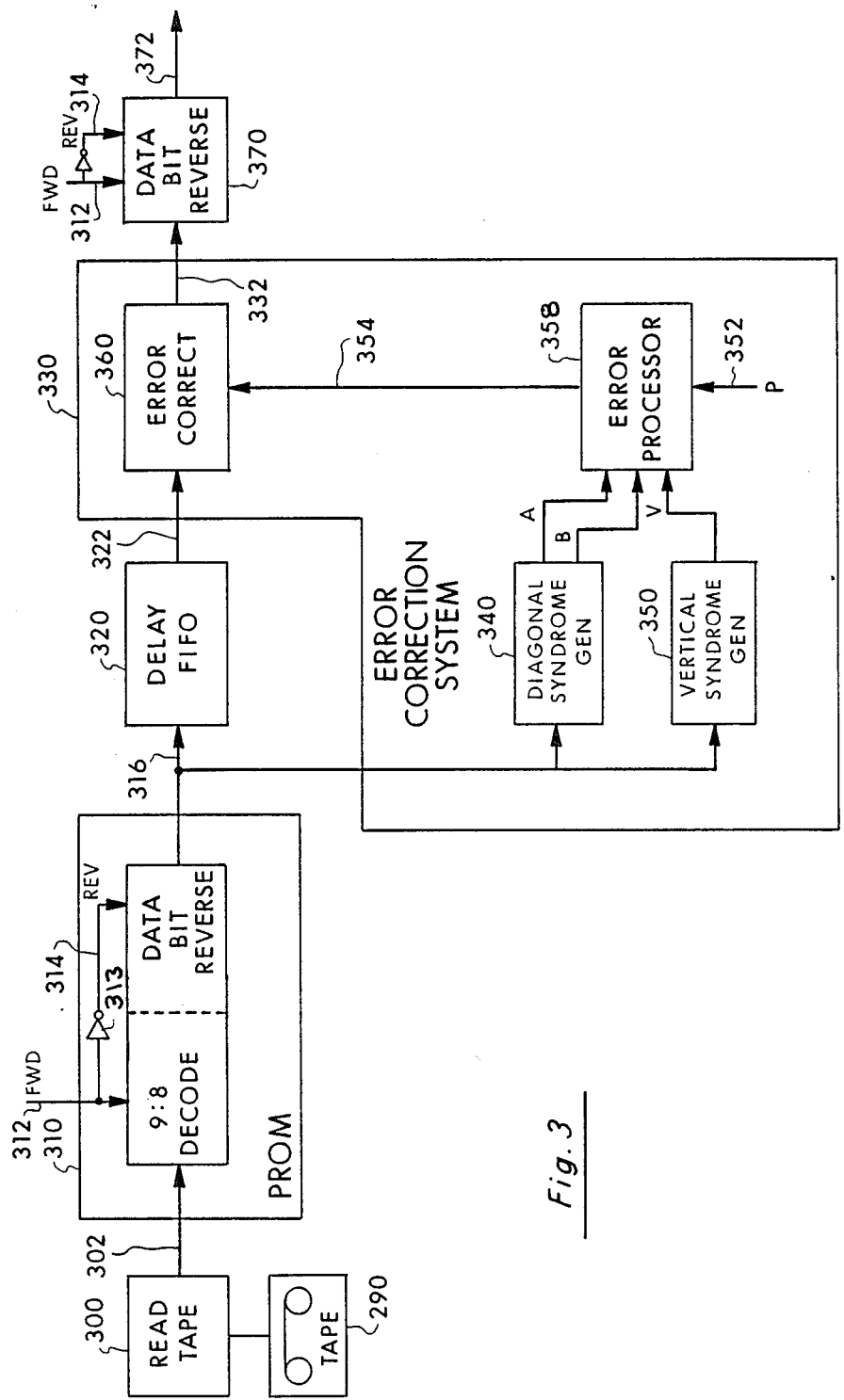
FIG. 3 is a block diagram of the single syndrome generator of the present invention which is capable of generating cross-parity code syndromes for both the forward and reverse reading directions of the high density magnetic tape.

In FIG. 3, the single syndrome generator of the present invention is set forth. The tape 290 is read 300 in a conventional fashion and the nine bit code is delivered over bus 302 to a PROM 310. As mentioned, the nine to eight decode circuit 204 in FIG. 2 is a PROM but, under the teachings of the present invention, one additional address bit, forward 312, is used in conjunction with the nine bits on bus 302 to form an address to the PROM. The output of the PROM is delivered on bus 316. Hence, by utilizing the two states for forward and reverse, the PROM 310 contains two sets of eight bit data-one for the forward reading of the tape and one for the reverse reading of the tape.

This is better shown in FIG. 4 where the PROM 310 has two areas of memory defined. One area of memory is defined for the forward eight bit data 400 and the second area 410 is allocated for the reverse eight bit data. In the forward direction, the forward signal on lead 312 forms part of the address defining the area 400 so that the nine bit data on bus 302 accesses the forward area 400 of memory for delivery of the eight bit data in the forward direction for delivery on bus 316. Likewise, when a tape is reading in reverse direction, lead 314 through action of inverter 313 becomes activated and the nine bit data delivered over bus 302 accesses the reverse area 410 of PROM 310 for delivery of the reverse eight bit data on bus 316. In this fashion, whether the tape is read in the forward or reverse directions, the data appearing on bus 316, for purposes of error correction, are in the same direction. The data appearing on bus 316 is oriented properly, but 0–7 relative to the user if the tape direction is forward. The data appearing on bus 316 is bit reversed 7–0 relative to the user if the tape direction is reverse.

It is to be expressly understood that while nine-bit data is read and converted to eight-bit data that any suitable "m-bit" data in a storage device can be converted to "n-bit" data.

The eight bit data on bus 316 as shown in FIG. 3, is also delivered to the conventional delay FIFO 320 which delays the data, as conventionally required, until the error correction system 330 is capable of correcting errors, if any, in the data field.

Under the teachings of the present invention, the error correction system 330 only requires a single set of a diagonal signal generator 340 and a vertical syndrome generator 350. In a conventional fashion, and as specifically taught by formulas 7, 8, 9, and 10 on page 550 of Patel's aforementioned paper entitled "Adaptive Cross Parity (A cross P) Code For A High-Density Magnetic Tape Sub-System", the vertical syndrome generator 350 and the diagonal syndrome generator 340 calculate the necessary values A, B, and V for delivery to the error processor 358 which, in response to the appropriate pointers on line 352 delivers error correction signals over lines 354 to the error correction circuit 360 to correct the errors, if any, in the data field. The timing is such that when the error correction circuit 360 is ready to correct an error the data field is being delivered from the delayed fifo 320 over lines 322 to the error correction circuit 360 so that the corrected data field is delivered over bus 332 to the data bit reversal circuit 370.

If the tape read direction is reverse, the corrected data delivered to bus 332 is bit reversed 0–7, and therefore must be reversed again before it is returned to the user. Hence, the data bit reversal circuit 370 receives a reversal signal 314 and a forward signal 312. In comparison to the conventional approach shown in FIG. 2, the data bit reversal circuit 370 also functions as a buffer 270. In the preferred embodiment, data bit reversal circuit 370 is a PAL of the type and model manufactured by Advanced Micro Devices (AMD), 901 Thompson Place, Sunnyvale, Calif. 94086 as Part No. AmPAL 22V10.

The logical implementation of the PAL 370 is shown in FIG. 5. For example to output D0 on bus 372 from the data bit reversal circuit 370 in the forward direction, line 312 is active to AND-gate 500 which will deliver D0 onto line 502 through OR-gate 504 and onto line 506. In the event the tape is being read in the reverse direction, lead 314 is activated to delivery bit D7 through AND-gate 508 onto lead 510 through OR-gate 504 onto lead 506. The remaining circuits provide buffer action. The information on 506 is delivered into AND-gate 512. If the buffer is to remain in the state of the last transaction, the AND-gate 512 will not extend the data on 506 to lead 514. In the event the data on line 506 to be read into the D-flip flop 516, NOT HOLD becomes active passing the data bit onto line 514 for delivery through the OR-gate 518 to the D-flipflop 516. The data can then be read out onto the data bus 372 for use by the system. However, in the event that the prior data bit resident in the D-flip flop 516 is to be maintained, the output of the D-flipflop 516 is fed back over line 520 to AND-gate 422 for delivery over lines 524 to the OR-gate 518.

There are a number of conventional approaches for implementing this logical function and, under the teachings of the present invention, PAL 370 is programmed based upon the following equations:

| | | | | | |
|---|---|---|---|---|---|
| RFD0 = | D0 | * | FWD | * | /HOLD |
| | + RFD0 | * | HOLD | | |
| | + D7 | * | REV | * | /HOLD |
| RFD1 = | D1 | * | FWD | * | /HOLD |
| | + RFD1 | * | HOLD | | |
| | + D6 | * | REV | * | /HOLD |
| RFD2 = | D2 | * | FWD | * | /HOLD |
| | + RFD2 | * | HOLD | | |
| | + D5 | * | REV | * | /HOLD |
| RFD3 = | D3 | * | FWD | * | /HOLD |
| | + RFD3 | * | HOLD | | |
| | + D4 | * | REV | * | /HOLD |
| RFD4 = | D4 | * | FWD | * | /HOLD |
| | + RFD4 | * | HOLD | | |
| | + D3 | * | REV | * | /HOLD |
| RFD5 = | D5 | * | FWD | * | /HOLD |
| | + RFD5 | * | HOLD | | |
| | + D2 | * | REV | * | /HOLD |
| RFD6 = | D6 | * | FWD | * | /HOLD |
| | + RFD6 | * | HOLD | | |
| | + D1 | * | REV | * | /HOLD |
| RDD7 = | D7 | * | FWD | * | /HOLD |
| | + RFD7 | * | HOLD | | |
| | + D0 | * | REV | * | /HOLD |

Where the variables are shown in FIG. 5, HOLD is generated internally.

While preferred embodiments of the present invention have been shown, it is to be expressly understood that modifications and changes may be made thereto and that the present invention is set forth in the following claims.

I claim:

1. A data reading system for error correcting data read from a reel to reel tape according to an adaptive cross-parity (AXP) process, said system comprising:
   means (300) for continuously reading m-bit data from said reel to reel tape (290),
   means (310) receptive of said m-bit data from said reading means for decoding said m-bit data into two sets of n-bit data, said first set of n-bit data corresponding to said m-bit data when said reel to reel tape moves in a forward direction, said first set of n-bit data being in the same bit order as said corresponding m-bit data, said second set of n-bit data corresponding to said m-bit data when said reel to reel tape moves in a reverse direction, said second set of n-bit data being in reverse bit order to said corresponding n-bit data in the first set,
   means (320,330) receptive of said first and second sets of n-bit data from said decoding means for correcting errors in said first and second sets of n-bit data according to said adaptive cross-parity process, and
   means (370) receptive of said corrected first and second sets of n-bit data from said correcting means for providing an output from said system, said output for said corrected first set of n-bit data corresponding in bit order to said first set of n-bit data, said output for said corrected second set of n-bit data corresponding in reverse bit order to said second set of n-bit data.

2. The system of claim 1 wherein said correcting means comprises:
   a diagonal syndrome generator (340) receptive of said first and second sets of n-bit data from said decoding means,
   a vertical syndrome generator (350) receptive of said first and second sets of n-bit data from said decoding means,
   an error processor (358) connected to said diagonal and vertical syndrome generators, and
   an error correction circuit (360) connected to said error processor for correcting errors in said first and second sets or n-bit data.

3. A data reading system for error correcting data read from a high density magnetic storage device according to an adaptive cross-parity (AXP) process, said system comprising:
   means (300) for continuously reading 9-bit data from said storage device (290),
   means (310) receptive of said 9-bit data from said reading means for decoding said 9-bit data into two sets of 8-bit data, said first set of 8-bit data corresponding to said 9-bit data when said storage device is read in a first direction, said second set of 8-bit data corresponding to said 9-bit data when said storage device is read in a second direction, said second set of 8-bit data being in reverse bit order to said corresponding 8-bit data in the said first set,
   means (320,330) receptive of said first and second sets of 8-bit data from said decoding means for correcting errors in said first and second sets of 8-bit data according to said adaptive cross-parity process, and
   means (370) receptive of said corrected first and second sets of 8-bit data from said correcting means for providing an output from said system, said output for said corrected first set of 8-bit data corresponding in bit order to said first set of 8-bit data, said output for said corrected second set of 8-bit data corresponding in reverse bit order to said second set of 8-bit data.

4. The system of claim 3 wherein said correcting means comprises:
   a diagonal syndrome generator (340) receptive of said first and second sets of 8-bit data from said decoding means,
   a vertical syndrome generator (350) receptive of said first and second sets of 8-bit data from said decoding means,
   an error processor (358) connected to said diagonal and vertical syndrome generators, and
   an error correction circuit (360) connected to said error processor for correcting errors in said first and second sets or 8-bit data.

5. An error correcting data reading system utilizing an adaptive cross-parity code for correcting data read from a reel to reel high density magnetic tape, said system comprising:
   means (300) for continuously reading 9-bit data from said reel to reel tape (290),
   a memory (310) receptive of said 9-bit data from said reading means for decoding said 9-bit data into two sets of 8-bit data, said first set of 8-bit data corresponding to said 9-bit data when said reel to reel tape moves in a forward direction, said second set of 8-bit data corresponding to said 9-bit data when said reel to reel tape moves in a reverse direction, said second set of 8-bit data being in reverse bit order to said corresponding 8-bit data in the said first set,
   means (320,330) receptive of said first and second sets of 8-bit data from said memory for correcting errors according to said code in said first and second sets of 8-bit data, said correcting means comprising a single set of diagonal and vertical syndrome generators for processing said first and second sets or 8-bit data, and means (370) receptive of said corrected first and second sets of 8-bit data from said correcting means for providing an output from said system, said output for said corrected first set of 8-bit data corresponding in bit order to said first set of 8-bit data, said output for said corrected second set of 8-bit data corresponding in reverse bit order to said second set of 8-bit data.

6. A method for correcting data read from a storage device containing m-bit data according to an adaptive cross-parity (AXP) process, said method comprising the steps of:

continuously reading the m-bit data from the storage device, decoding the m-bit data into two sets of n-bit data, the first set of n-bit data corresponding to the m-bit data when the storage device is read in a first direction, the second set of n-bit data corresponding to the decoded m-bit data when the storage device is read in a second direction, the second set of n-bit data being in reverse bit order to the corresponding decoded n-bit data in the said first set, correcting errors in the first and second sets of n-bit data with a single set of syndrome generators according to said adaptive cross-parity process, and providing an output for the corrected first set of n-bit data corresponding in bit order to the first set of n-bit data, providing an output for the corrected second set of n-bit data in reverse bit order to the second set of n-bit data in order to correspond with the bit order of the decoded m-bit data when read in the reverse direction.

7. A method for correcting data read from a high density reel to reel tape containing m-bit data according to an adaptive cross-parity (AXP) process, said method comprising the steps of:

continuously reading the m-bit data from the reel to reel tape, decoding the m-bit data into two sets of n-bit data, the first set of n-bit data corresponding to the m-bit data when the tape is read in a first direction, the second set of n-bit data corresponding to the decoded m-bit data when the tape is read in a second direction, the second set of n-bit data being in reverse bit order to the corresponding decoded n-bit data in the first set, correcting diagonal errors in the first and second sets of n-bit data with a single diagonal syndrome generators, correcting vertical errors in the first and second sets of n-bit data with a single vertical syndrome generator according to said adaptive cross-parity process, and providing an output for the corrected first set of n-bit data corresponding in bit order to the first set of n-bit data, providing an output for the corrected second set of n-bit data in reverse bit order to the second set of n-bit data in order to correspond with the bit order of the decoded m-bit data when read in the reverse direction.

* * * * *